United States Patent
Lindemulder et al.

(10) Patent No.: US 10,767,318 B2
(45) Date of Patent: Sep. 8, 2020

(54) ROBOTICALLY-CONTROLLED LASER CLADDING PROCESS FOR REPAIR OF WORN AND/OR DAMAGED RAILWAY STRUCTURES

(71) Applicants: Holland, L.P., Crete, IL (US); Titanova, Inc., St. Charles, MO (US)

(72) Inventors: Paul Lindemulder, Lansing, IL (US); Richard F. Kral, N. Riverside, IL (US); John Haake, St. Charles, MO (US)

(73) Assignees: Holland, L.P., Crete, IL (US); Titanova, Inc., St. Charles, MO (US)

(*) Notice: Subject to any disclaimer, the term of this patent is extended or adjusted under 35 U.S.C. 154(b) by 217 days.

(21) Appl. No.: 15/431,338

(22) Filed: Feb. 13, 2017

(65) Prior Publication Data
US 2017/0233954 A1 Aug. 17, 2017

Related U.S. Application Data
(60) Provisional application No. 62/294,727, filed on Feb. 12, 2016.

(51) Int. Cl.
*B23K 26/14* (2014.01)
*E01B 31/12* (2006.01)
(Continued)

(52) U.S. Cl.
CPC .......... *E01B 31/12* (2013.01); *B23K 26/0096* (2013.01); *B23K 26/123* (2013.01);
(Continued)

(58) Field of Classification Search
CPC ............... B23K 26/0096; B23K 26/34; B23K 26/0676; B23K 26/142; B23K 26/123;
(Continued)

(56) References Cited

U.S. PATENT DOCUMENTS

| | | | | |
|---|---|---|---|---|
| 4,905,310 A | * | 2/1990 | Ulrich | B23K 26/1435 219/121.64 |
| 6,168,676 B1 | | 1/2001 | Seguin | |

(Continued)

FOREIGN PATENT DOCUMENTS

| | | |
|---|---|---|
| CN | 102864704 | 1/2013 |
| DE | 202005011968 U | 5/2006 |

OTHER PUBLICATIONS

International Search Report and Written Opinion, PCT Pat. App. No. PCT/US2017/017688.
EP1775075.9, Supplementary European Search, dated Jul. 1, 2019.

*Primary Examiner* — Brian W Jennison
(74) *Attorney, Agent, or Firm* — Scherrer Patent & Trademark Law, P.C.; Stephen T. Scherrer; Monique A. Morneault

(57) ABSTRACT

An improved process for repair of worn and damaged surfaces of railway structures such as frog and diamond transition surfaces, rail head surfaces and wheels. A worn or damaged surface is prepared using a robotically-controlled laser to melt or gouge away metal using controlled laser energy and air pressure to remove existing worn or damaged surfaces. The process further utilizes laser cladding, laser weld overlaying, or laser additive manufacturing, of formulated powder, wire or stick welding material to worn surfaces that have been prepared for material build-up to original dimensions and similar metallurgical properties.

22 Claims, 1 Drawing Sheet

(51) Int. Cl.
  *B23P 6/00* (2006.01)
  *B23K 26/144* (2014.01)
  *B23K 26/361* (2014.01)
  *B23K 26/142* (2014.01)
  *B23K 26/00* (2014.01)
  *B23K 26/12* (2014.01)
  *B23K 26/34* (2014.01)
  *B23K 26/36* (2014.01)
  *E01B 31/18* (2006.01)
  *B23K 101/26* (2006.01)
  *B23K 103/04* (2006.01)

(52) U.S. Cl.
  CPC .......... *B23K 26/142* (2015.10); *B23K 26/144* (2015.10); *B23K 26/34* (2013.01); *B23K 26/36* (2013.01); *B23K 26/361* (2015.10); *B23P 6/00* (2013.01); *E01B 31/18* (2013.01); *B23K 2101/26* (2018.08); *B23K 2103/04* (2018.08)

(58) Field of Classification Search
  CPC .. B23K 26/36; B23K 26/0807; B23K 26/421; B23K 26/345; B23K 26/083; B23K 26/365; E01B 31/18
  See application file for complete search history.

(56) References Cited

U.S. PATENT DOCUMENTS

| | | | |
|---|---|---|---|
| 6,568,077 B1* | 5/2003 | Hellemann | B23K 9/044 29/889.1 |
| 6,787,726 B2* | 9/2004 | Thelen | B23K 9/0026 219/54 |
| 2006/0067830 A1* | 3/2006 | Guo | B23P 6/007 416/229 R |
| 2009/0320288 A1* | 12/2009 | Yelistratov | B23K 26/24 29/889.1 |
| 2013/0284706 A1* | 10/2013 | Kral | B23K 11/0013 219/55 |
| 2015/0020707 A1 | 1/2015 | Zeng et al. | |
| 2015/0069025 A1* | 3/2015 | Luick | B23K 26/0676 219/76.1 |
| 2015/0122783 A1 | 5/2015 | Luick et al. | |

* cited by examiner

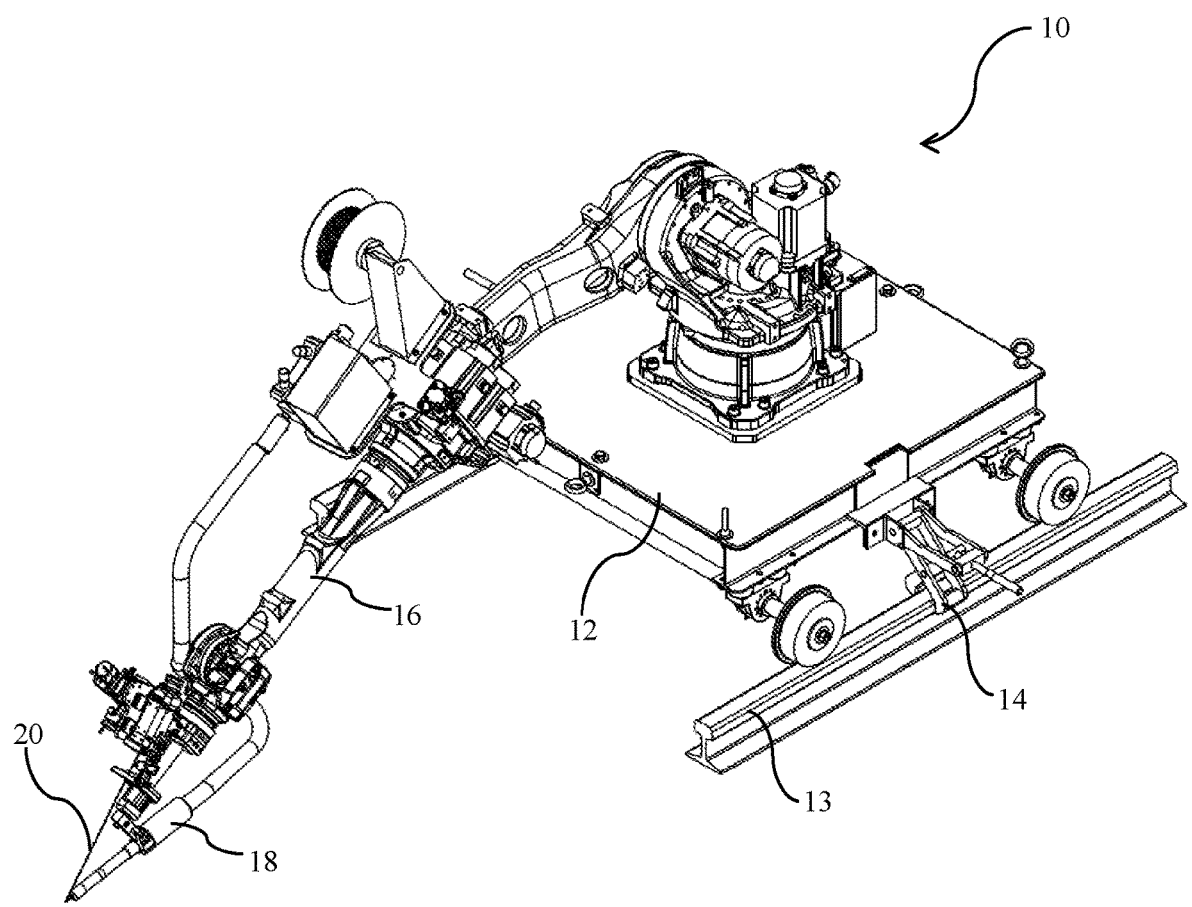

ROBOTICALLY-CONTROLLED LASER CLADDING PROCESS FOR REPAIR OF WORN AND/OR DAMAGED RAILWAY STRUCTURES

The present invention claims priority to U.S. Prov. Pat. App. No. 62/294,727, titled "Robotically-Controlled Laser Cladding Process for Repair of Worn and/or Damaged Railway Structures", filed Feb. 12, 2016, which is incorporated by reference herein in its entirety.

TECHNICAL FIELD

The present disclosure relates to an improved process for repair of worn and damaged surfaces of railway structures such as frog and diamond transition surfaces, rail head surfaces and wheels. A worn or damaged surface may be prepared using a robotically-controlled laser to melt or gouge away metal using controlled laser energy and air pressure to remove existing worn or damaged surfaces. The process further utilizes laser cladding, laser weld overlaying, or laser additive manufacturing, of formulated powder, wire or stick welding material to worn surfaces that have been prepared for material build-up to original dimensions and similar metallurgical properties.

BACKGROUND

Railway track infrastructure wears and degrades continually from increasing traffic, heavy axle loads and increasing speeds. As rail, crossing and switch point surfaces wear, the railroads continually need to repair or replace the damaged surfaces. This has become increasingly more difficult with less available track time due to increasing traffic and train speed demands. Moreover, the need to repair this infrastructure becomes increasingly necessary due to regulatory requirements.

Manganese frog and diamond transition points are more susceptible to damage due to the wheel impact across the open transition points. Current repair processes utilize arc gouging and grinding techniques in the field to remove the damaged surfaces, followed by metal inert gas ("MIG") welding of stick or wire manganese to layer, or build-up, new layers until more than the original dimensions have been achieved. The surface is then ground back down to the specified dimensions. The life of the repair is dependent on operator skill and ability to keep the temperature of the parent material under a specified temperature, 500 degrees F. The life of the repair also depends on the ability of the operator to remove slag between layers created by the MIG welding process. All of this is complicated by the environmental conditions and the time pressure to clear the track or switch for traffic needs.

It is often that rail surfaces having deep damage may be replaced completely instead of repaired. Rail surfaces are typically removed by replacing sections of the rail and welding in a new section with two Thermite or flash butt welds. This typically requires removing and replacing large sections of track.

To prepare a worn surface for repair, a section thereof of the worn surface is typically arc gouged and the heat affected zone is then ground smooth using a grinder and torch to remove arc gouging slag. An operator must typically utilize the grinder and torch by hand. Thus, it may be difficult for an operator to precisely grind away the surface fully to prepare for repair. In addition, because an operator typically utilizes the grinder by hand, the precise contours of the ground surface may be difficult to control. Moreover, grinding railway structures may be hazardous due to the propensity of the arc gouging, grinding and torch tools to throw sparks, which may cause fires, damage or injury, and the generation of fumes, which may be hazardous to operators' health.

Typical MIG welding of rail surfaces requires deposition of metal material, such as steel manganese alloys, at precisely controlled interpass temperatures. During the welding process, the temperature of the metal surface must typically be maintained at or below the specific interpass temperature, such as below 500 degrees F.

MIG welding often leads to voids, entrapped slag or metal oxide by-products, cracks and overheating between layers of deposited material, which can significantly reduce the life of a railway structure. The primary culprit in premature degradation of the manganese material is overheating. An operator must typically constantly stop or use forced air cooling to ensure the interpass temperature between layers is maintained below 500 degrees F.

In addition, typical welding creates slag materials or metal oxide by-products that must be scraped from the railway structure as metal is deposited thereon. Thus, after a layer of material is welded thereon, the slag is typically manually removed using all or a combination of descalers, hammering and wire brushing, and another layer is added thereto. Invariably, due to the chaotic nature of the weld process and human errors or lack of attention, weld slag is typically entrapped below and in the weld repair surface. Repairing worn or damaged surfaces of railway surfaces is often slow, tedious, inefficient and operator dependent.

A need, therefore, exists for a process for repairing railway structures. Specifically, a need exists for a process for repairing railway structures, such as rails and transition points, such as frog and diamond transitions. More specifically, a need exists for a process for repairing railway structures, such as rails and transition points, having surfaces worn and damaged by rail traffic.

Moreover, a need exists for a process for removing worn and damaged surfaces of a railway structure using a laser removal system. In addition, a need exists for a laser removal system that quickly, efficiently, precisely and cost-effectively removes metal surface material from worn and damaged railway structures.

Further, a need exists for a process to build-up surfaces of railway structures for repairing the same using a laser cladding, laser overlaying, or laser additive manufacturing system and process. Still further, a need exists for a laser cladding, laser overlaying, or laser additive manufacturing system and process that quickly, efficiently, and precisely deposits metal surface material to a railway structure to repair the same.

Specifically, a need exists for a laser cladding, laser overlaying or laser additive manufacturing system and process having large deposition rates using both powder feed and hot wire.

In addition, a need exists for a laser removal and/or laser cladding process for worn railway structures that is precisely controlled, and controls and reduces the amount of heat input into the railway structure. More specifically, a need exists for a laser removal and/or laser cladding process that maintains the temperature below 500 degrees F.

Further, a need exists for a laser cladding, laser overlaying or laser additive manufacturing system and process that utilize a variety of materials, such as powder, wire, strip and other like materials. Still further, a need exists for a laser cladding, laser overlaying or laser additive manufacturing system and process that can be utilized to building up a variety of 3D shapes, providing more control of the final shape of the repair and reducing or eliminating subsequent machining and grinding steps.

Moreover, a need exists for a laser removal and/or laser cladding process that is robotically-controlled. Specifically, a need exists for a laser removal and/or laser cladding, laser overlaying or laser additive manufacturing system and process that is automatically controlled, achieves high levels of gouging and/or welding, and provides high quality laser removal and/or laser weld overlays.

SUMMARY OF THE INVENTION

The present disclosure relates to an improved process for repair of worn and damaged surfaces of railway structures such as frog and diamond transition surfaces, rail head surfaces and wheels. A worn or damaged surface may be prepared using a robotically-controlled laser to gouge or melt away metal using controlled laser energy and air pressure to remove existing worn or damaged surfaces. The process further utilizes laser cladding, laser weld overlaying, or laser additive manufacturing, of formulated powder, wire or stick welding material to worn surfaces that have been prepared for material build-up to original dimensions and similar metallurgical properties.

To this end, in an embodiment of the present invention, a method of repairing a worn railway structure is provided. The method comprises the steps of: providing a worn metal railway structure; providing a laser system having a first laser beam having a first laser energy having a specific structured beam shape; removing layers of metal from the worn railway structure with the first laser beam to form a prepared surface; and depositing metal material onto the prepared surface using a second laser beam from the laser system to form a finished surface of the railway structure.

In an embodiment, the method further comprising the step of: polishing the finished surface of the railway structure to form a polished finished surface of the railway structure.

In an embodiment, the method further comprises the step of: scanning the worn railway surface with a scanner to form a scanned image; and determining the amount of metal to remove from the worn railway surface with the first laser beam by comparing the scanned image to a second image.

In an embodiment, the first laser beam is combined with a gas.

In an embodiment, the gas comprises an amount of oxygen.

In an embodiment, the gas is compressed.

In an embodiment, the method further comprises the step of: blowing the metal from the worn surface using the compressed gas.

In an embodiment, the first laser energy is increased with the addition of the gas.

In an embodiment, the method further comprises the step of: changing the profile of the first laser beam after determining the amount of metal to remove from the worn railway surface.

In an embodiment, the metal material deposited by the second laser beam is a deposition material selected from the group consisting of a wire, a stick and a powder.

In an embodiment, the temperature of the railway structure is maintained below 500° F. during metal removal from and metal deposition to the railway structure.

In an embodiment, the method further comprises the step of: heating the railway structure before depositing the metal material onto the prepared surface.

In an embodiment, the railway structure is heated by the second laser.

In an embodiment, the railway structure is heated by a heat source.

In an embodiment, the second laser beam is combined with an inert gas when depositing metal material onto the prepared surface.

In an embodiment, the inert gas is argon gas.

In an embodiment, the first laser beam and the second laser beam emanate from the same laser beam source.

In an embodiment, the first laser beam energy and the second laser beam energy have a power of between about 8 and about 50 kW.

In an embodiment, the laser system is disposed on a rig and further comprising the step of: clamping the rig to the railway structure.

In an embodiment, the rig is connected to a boom on a truck, and further comprising the step of: deploying the truck to the worn railway structure and moving the rig to the worn railway structure via the boom.

It is, therefore, an advantage and objective of the present invention to provide a process for repairing railway structures.

Specifically, it is an advantage and objective of the present invention to provide a process for repairing railway structures, such as rails and transition points, such as frog and diamond transitions.

More specifically, it is an advantage and objective of the present invention to provide a process for repairing railway structures, such as rails and transition points, having surfaces worn and/or damaged by rail traffic.

Moreover, it is an advantage and objective of the present invention to provide a process for removing worn and/or damaged surfaces of a railway structure using a laser removal system.

In addition, it is an advantage and objective of the present invention to provide a laser removal system that quickly, efficiently, and precisely removes metal surface material from worn and/or damaged railway structures.

Further, it is an advantage and objective of the present invention to provide a process to build-up surfaces of railway structures for repairing the same using a laser cladding, laser overlaying or laser additive manufacturing system and process.

Still further, it is an advantage and objective of the present invention to provide a laser cladding, laser overlaying or laser additive manufacturing system and process that quickly, efficiently, and precisely deposits metal surface material to a railway structure to repair the same.

In addition, it is an advantage and objective of the present invention to provide a laser removal and/or laser cladding process for worn railway structures that is precisely controlled, and controls and reduces the amount of heat input into the railway structure.

More specifically, it is an advantage and objective of the present invention to provide a laser removal and/or laser cladding, laser overlaying or laser additive manufacturing system and process that maintains the temperature below 500 degrees F.

Further, it is an advantage and objective of the present invention to provide a laser cladding, laser overlaying or laser additive manufacturing system and process that utilize a variety of materials, such as powder, wire, strip and other like materials.

Still further, it is an advantage and objective of the present invention to provide a laser cladding, laser overlaying or laser additive manufacturing system and process that can be utilized to building up a variety of 3D shapes, providing more control of the final shape of the repair and reducing or eliminating subsequent machining and grinding steps.

Moreover, it is an advantage and objective of the present invention to provide a laser removal and/or laser cladding process, laser overlaying or laser additive manufacturing system and process that is robotically-controlled.

Specifically, it is an advantage and objective of the present invention to provide a laser removal and/or laser cladding, laser overlaying or laser additive manufacturing system and process that is automatically controlled, achieves high levels of gouging and/or welding, and provides high quality laser removal and/or laser weld overlays.

Additional features and advantages of the present invention are described in, and will be apparent from, the detailed description of the presently preferred embodiments and from the drawings.

BRIEF DESCRIPTION OF THE DRAWINGS

The drawing FIGURES depict one or more implementations in accord with the present concepts, by way of example only, not by way of limitations. In the FIGURES, like reference numerals refer to the same or similar elements.

FIG. 1 illustrates a front perspective view of a rig having a laser source for removal and/or cladding of metal to a rail in an embodiment of the present invention.

DETAILED DESCRIPTION OF THE PRESENTLY PREFERRED EMBODIMENTS

The present disclosure relates to an improved process for repair of worn and damaged surfaces of railway structures such as frog and diamond transition surfaces, rail head surfaces and wheels. A worn or damaged surface may be prepared using a robotically-controlled laser to gouge away metal using controlled laser energy and air pressure to remove existing worn or damaged surfaces. The process further utilizes laser cladding, laser weld overlaying, or laser additive manufacturing, of formulated powder, wire or stick welding material to worn surfaces that have been prepared for material build-up to original dimensions and similar metallurgical properties.

Laser Removal of Surface Material

In a first step of the present invention, a railway structure requiring repair may be prepared for laser cladding. Specifically, the worn surface is inspected and an amount of material is determined for removal to provide a smooth, clean and crack-free surface for the deposition of material thereto. The worn surface may be any surface of a railway structure, and may include, for example, rails and/or transition structures, such as frogs or diamonds, wheels or other like structures. Typically, transition points suffer much wear due to wheel impact across open transition points. Precise removal and deposition of railway structures may typically be very difficult.

An operator may visually inspect a railway structure surface and determine whether and how much material to remove. Alternatively, a scanner may scan the railway structure surface and determine, based on the scan thereof, the extent of wear on the railway structure surface, and the amount of surface to remove to prepare the surface thereof for deposition for repair of the same.

For example, a railway structure may have a particular shape and/or profile which may be determined by scanning the railway structure. A database of railway structures may be consulted and the scan of the railway structure may be compared to information contained in the database. Alternatively, the system may scan the railway structure and an operator may utilize the scan to determine the precise shape and/or profile of the railway structure. Based on the comparison of the scanned railway structure and, specifically, the worn or damaged surface thereof, to a stored railway structure in a database, the system may automatically determine how much material must be removed from the railway structure surface to properly prepare the same for material deposition.

Once it is determined how much material must be removed, a laser removal system may be placed over the railway structure, and may be controlled to remove, via laser removal, layers of metal from the railway structure. Specifically, laser energy combined with air, oxygen or other gas, may, generally, melt metal material from the surface of the railway structure layer by layer until the entirety of the surface is fully prepared for the deposition process. Typically, a layer of metal in the amount of about 0.02 of an inch may be removed, although any amount of material may be removed, and the present invention should not be limited as described herein. Specifically, the laser energy, combined with a gas such as air, oxygen, or other like compressed gas, may increase the energy of the laser, thereby increasing the amount of material melted and removed. Moreover, the compressed gas may further provide the additional benefit of removing the melted material.

An operator may program the laser to remove layers of material from the surface of a railway structure. Specifically, the operator may program the laser to start and stop laser removal at certain locations, and how deep to go into the surface of the railway structure during laser removal. For example, an operator may provide plurality of points between which the laser removal system may remove material.

In an automatic process, the scanning system may be tied to or otherwise communicate with the laser removal system, and may provide the precise contours for the laser removal. Thus, the laser removal system may automatically remove the surface thereof until the surface is fully prepared.

The laser system may further provide control of the laser beam profile and shape to achieve various effects during the laser removal, such as utilizing particular optics to achieve the same. Specifically, a wider beam or a narrower beam may be desired to achieve wider or narrow removal of material from railway structure surfaces, or to provide deeper or shallower metal removal. The compressed gas may also be controlled via the use of different nozzles to provide an aerodynamic flow of the compressed gas to the laser beam spot on the workpiece as desired for the particular application. Thus, the compressed gas may be controlled via changing nozzles, pressures, percentages of oxygen, or in other like ways.

In a preferred embodiment, the laser removal system may be placed upon a rail by one or more operators, and may be clamped or locked thereto to ensure that the laser system is mechanically immobile. In a preferred embodiment, the laser system may be contained on a rig that may be tied or connected to a truck, either rail-bound or not. The rig may be connected to a boom or deployment system that may make it easier to manipulate and place the laser system where desired. Moreover, the rig may provide cooling, power and/or compressed gas to the laser system when using it for laser removal.

Further, the laser removal system may track the amount of material that is removed, and may further, based on the surface provided after removal of the material therefrom, automatically determine where to deposit material, and how much material may be necessary to deposit thereon to build the surface back up.

Laser Cladding or Laser Welding

In a second step of the present invention, material may be deposited upon a prepared surface to build-up the surface and repair the same. Specifically, laser energy may be combined with deposition material in a laser cladding or laser welding process to deposit material thereto. More specifically, laser energy, in the form of a laser beam, may be fed a metal alloy source, such as a wire, stick or powder, whereupon the laser energy simultaneously melts the metal alloy source and the base metal and deposits the metal alloy where desired on the surface of the railway structure, preferably at the location of the surface prepared according to the process disclosed above. The laser energy melts the metal alloy source and at the same time heats the repair surface to form a bond between the surface and the metal alloy source deposited thereto. The laser may apply the metal alloy to the surface thereof in spots, strips, or in any other 3D shape.

Typically, in manganese (MN) railway structures, the temperature of the railway structure must be maintained below a certain temperature to prevent damage to the MN railway structure. For example, it is typical that a MN railway structure must be maintained below 500 degrees F. to prevent or minimize metallurgical damage thereto. The laser energy provided to deposit material thereto is naturally a lower heat process, and thus the temperature of the MN railway structure may more easily be maintained below 500 degrees F. In addition, as noted above, the prepared surface of the MN railway structure may be heated at the same time the metal is deposited thereon by the laser energy, eliminating the need to pre-heat the MN railway structure prior to deposition, which may provide a quicker, more efficient process.

Laser cladding or laser welding may provide a more precise layering process to provide a finished surface that needs little or no grinding or finishing for immediate train traffic. In addition, because the temperature may be precisely controlled, the bond between the surface and the metal deposited thereto may easily meet the strength, toughness and wear requirements of the application. Moreover, because of the precise layering process, cracks and voids between layers are minimized or eliminated, significantly increasing the longevity of the repaired railway structure.

In a preferred embodiment, the material deposition as described herein may be accomplished in combination with an inert gas, such as, preferably Argon gas to minimize or eliminate the development of slag, metal oxide by-products or other undesirable components. In typical MIG welding, metal oxide by-products must be removed after a layer is deposited and before an additional layer is added. According to the present process, the development of metal oxide by-products may be significantly reduced or eliminated when the laser energy and metal source material are combined with an inert gas. This may minimize or eliminate the need to remove the metal oxide by-products therefrom between layers. This may significantly reduce the time required to deposit material to the surface of the railway structure.

Precise control of the laser deposition process described herein may be accomplished automatically. Specifically, an operator may program the laser cladding system with the specific surface to deposit the metal thereto. In an alternate embodiment, the system may automatically determine how much metal to deposit and where to deposit to achieve the finished railway structure. Moreover, the laser deposition process may be carefully controlled by utilizing different optics for the laser energy itself or nozzles to configure the application of the metal source and/or of the inert gas thereto to eliminate slag.

The metal source material may be in the form of a metal alloy powder, wire, stick, strip or other like form. For example, if in wire form, the wire may be provided to the laser system either cold or heated by passing a current therethrough, which may aid in the melting and deposition thereof to the surface. Preferably, metal source is in the form of a powder that may be precisely fed into the laser energy for deposition to the surface. Preferably, the powder may be a specially formulated steel-based manganese powder that may provide similar or improved metallurgical characteristics to the parent material surface being repaired.

The laser source may be provided on a rig that may be clamped to the railway structure to ensure that the material is deposited thereto precisely. The rig may further be contained on a boom or deployment system attached to a truck for movement of the same to the desired place the railway to implement in the field. The rig may further be provided an energy source, a metal source, and/or an inert gas source for use thereof, as described herein.

In a preferred embodiment, the laser removal system and process and the laser deposition process may be accomplished by the same laser system. Specifically, a laser system may be utilized having sufficient laser energy to both remove metal from the surface of a railway structure and to deposit material thereto in a laser cladding process. Preferably, laser energy in an amount between about 8 and about 50 kW may be utilized to accomplish both the surface removal and the deposition of metal thereto. In a preferred embodiment, a laser energy source provided by Laserline, Mfg. Inc. may be utilized for such a purpose.

FIG. 1 illustrates a perspective view of a laser system 10 for the removal of material, specifically metal from a rail and/or cladding of metal onto a rail in an embodiment of the present invention. The laser system 10 comprises a rig 12 which may be disposed on a railway structure 13, namely a pair of parallel rails, and clamped thereto via at least one clamp 14. The rig 12 may further have a boom 16 on which a laser source 18 may be disposed. The laser source 18 may be used for one or both of laser removal of metal from a rail and cladding of metal to a rail surface, as described herein. If the laser source 18 used to remove metal from a worn railway surface, the laser source 18 may be used at a desired energy level to accomplish the same. If the laser source 18 is used to clad metal to a railway surface, the laser source 18 may be directed at a metal source, such as an extended wire 20 that may allow metal to be deposited on the railway surface.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are nonlimiting, and it should be noted that claim limitations presented herein are not meant to describe the invention as a whole. Moreover, the invention illustratively disclosed herein suitably may be practiced in the absence of any element which is not specifically disclosed herein.

The invention claimed is:

1. A method of repairing a worn railway structure comprising the steps of:
    providing a metal railway structure comprising a surface;
    providing a laser system having a first laser beam having a first laser energy having a specific structured beam shape;
    removing a plurality of layers of metal from a location of the surface of the railway structure with the first laser beam to form a prepared surface having a depth from the surface of the metal railway structure, the depth formed by the first laser beam; and
    depositing metal material onto the location of the prepared surface using a second laser beam from the laser system and a deposition material combined with the second laser beam to form a finished surface of the railway structure,
    wherein the temperature of the railway structure is maintained below 500° F. during metal removal from the railway structure with the first laser beam and metal deposition to the railway structure with the second laser beam.

2. The method of claim 1 further comprising the step of:
    polishing the finished surface of the railway structure to form a polished finished surface of the railway structure.

3. The method of claim 1 further comprising the step of:
    scanning the railway surface with a scanner to form a scanned image; and
    determining the amount of metal to remove from the railway surface with the first laser beam by comparing the scanned image to a second image.

4. The method of claim 1 wherein the first laser beam is combined with a gas.

5. The method of claim 4 wherein the gas comprises an amount of oxygen.

6. The method of claim 4 wherein the gas is compressed.

7. The method of claim 6 further comprising the step of:
    blowing the amount of metal from the railway structure using the compressed gas.

8. The method of claim 4 wherein the first laser energy is increased with the addition of the gas.

9. The method of claim 3 further comprising the step of:
    changing the profile of the first laser beam after determining the amount of metal to remove from the railway structure.

10. The method of claim 1 wherein the deposition material is selected from the group consisting of a wire, a stick and a powder.

11. The method of claim 1 further comprising the step of:
    heating the railway structure before depositing the metal material onto the prepared surface.

12. The method of claim 11 wherein the railway structure is heated by the second laser.

13. The method of claim 11 wherein the railway structure is heated by a heat source.

14. The method of claim 1 wherein the second laser beam is combined with an inert gas when depositing metal material onto the prepared surface.

15. The method of claim 14 wherein the inert gas is argon gas.

16. The method of claim 1 wherein the first laser beam and the second laser beam emanate from the same laser beam source.

17. The method of claim 1 wherein the first laser beam energy and the second laser beam energy have a power of below about 50 kW.

18. The method of claim 1 wherein the laser system is disposed on a support rig and further comprising the step of:
    clamping the support rig to the railway structure.

19. The method of claim 18 wherein the support rig is connected to a boom on a truck, and further comprising the step of:
    deploying the truck to the railway structure and moving the rig to the railway structure via the boom.

20. A method of repairing a worn railway structure comprising the steps of:
    providing a metal railway structure comprising a pair of parallel rails and further comprising a surface;
    providing a laser system comprising a support rig disposed on the metal railway structure and a clamp, wherein the clamp rigidly holds the rig to the metal railway structure, the laser system further having a first laser beam and a metal cladding material; and
    depositing the metal cladding material onto a location of the surface of the metal railway structure using the first laser beam,
    wherein the metal cladding material is heated prior to depositing the metal cladding material with the first laser beam,
    wherein the temperature of the railway structure is maintained below 500° F. during deposition of the metal cladding material to the railway structure with the first laser beam.

21. The method of claim 20 wherein the metal cladding material is wire.

22. The method of claim 21 wherein the step of pre-heating the metal cladding material comprises electrically pre-heating the wire.

* * * * *